Aug. 20, 1968   W. REYLE   3,397,854
AIRCRAFT OF LARGE WING SPAN
Filed Sept. 11, 1964   5 Sheets-Sheet 1
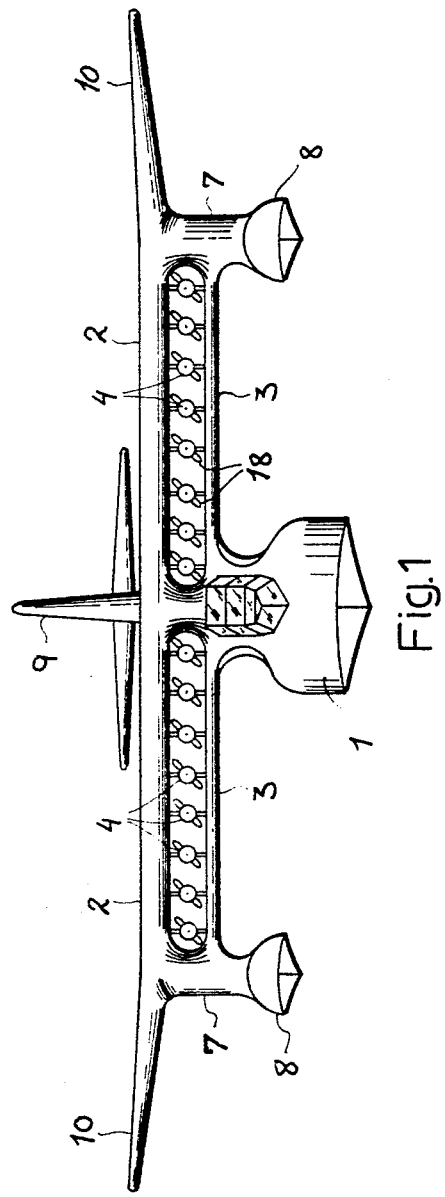
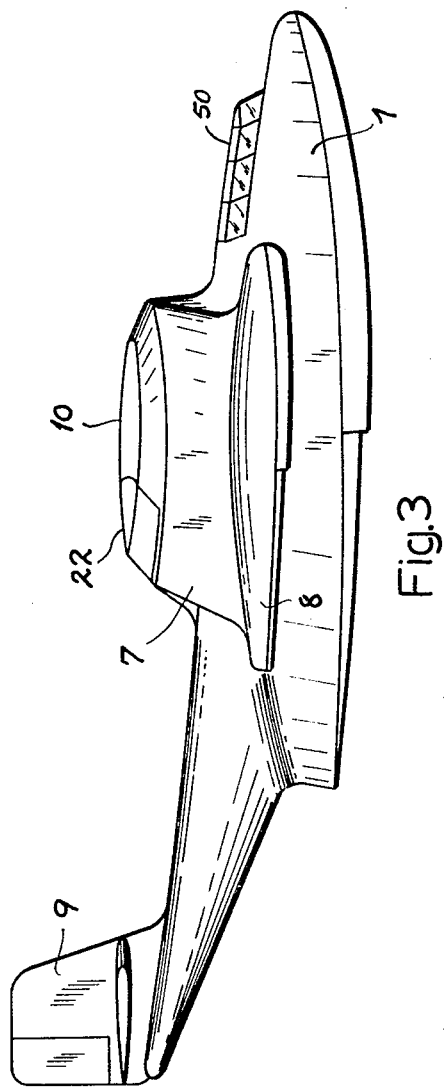
Walter Reyle
INVENTOR.
BY *Hestern, Ross & Hestern*

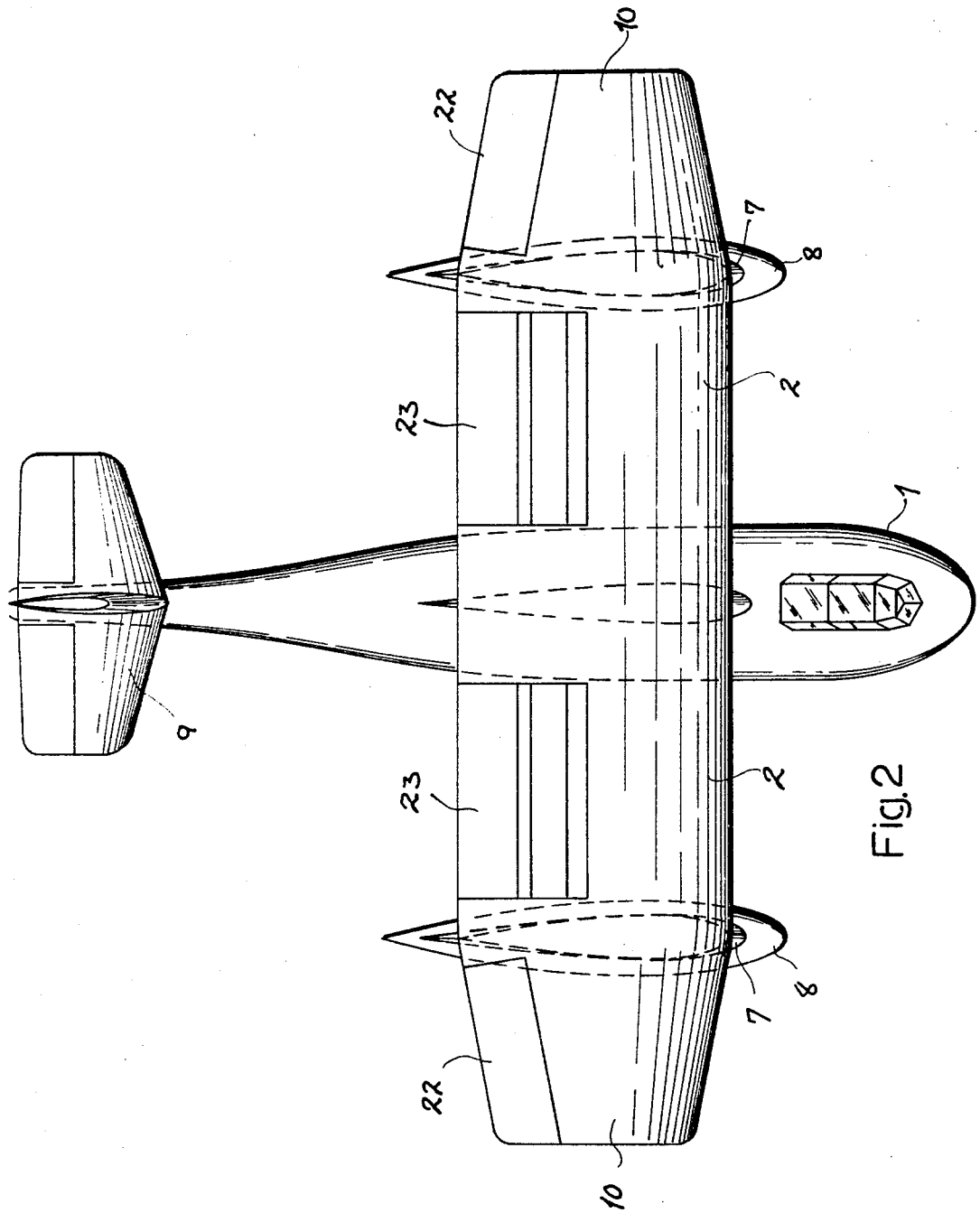

Aug. 20, 1968   W. REYLE   3,397,854
AIRCRAFT OF LARGE WING SPAN
Filed Sept. 11, 1964   5 Sheets-Sheet 4

Walter Reyle
INVENTOR.

BY *Mestern, Ross & Mestern*

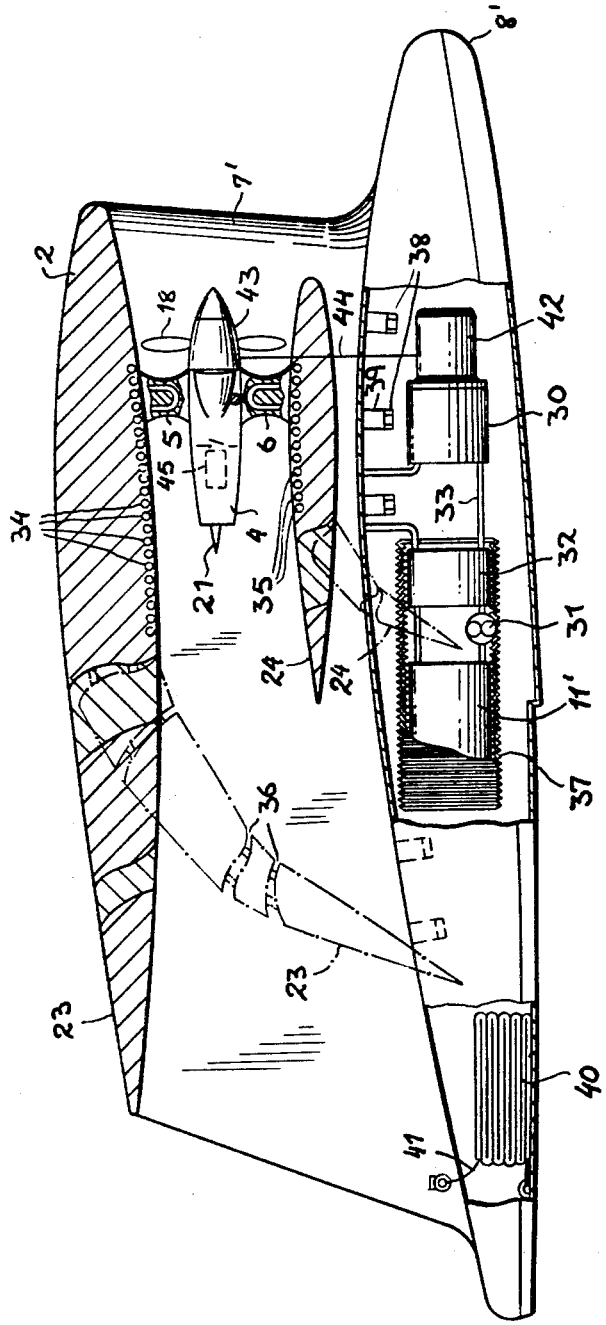

United States Patent Office 3,397,854
Patented Aug. 20, 1968

3,397,854
AIRCRAFT OF LARGE WING SPAN
Walter Reyle, 14 Gottorpstrasse,
29 Oldenburg, Germany
Filed Sept. 11, 1964, Ser. No. 395,709
Claims priority, application Germany, Sept. 12, 1963,
R 36,107
13 Claims. (Cl. 244—55)

My present invention relates to aircraft of large wing span and high load-carrying capacity.

Although modern long-range airplanes operate at increased speeds and with enhanced safety, no major strides have been made in recent years toward greater load-carrying capacity. Existing airport facilities, runways and landing-gear constructions, as well as considerations of noise abatement around inhabited areas, severely limit the maximum payloads that could be handled with conventional aeronautical designs; even the projected utilization of nuclear propulsion, not yet realized in practice, does not hold out much promise of early improvements in this regard.

While the aforestated limitations do not apply to hydroplanes, there has not yet been any development in the field of seagoing aircraft which would justify a general shift to flying boats for either civilian or military purposes.

The general object of this invention is to provide an aircraft, preferably of the flying-boat type, whose wing structure and propulsion system is capable of more effectively translating the available energy into lift so as to sustain larger payloads than can be carried by conventional land-based or seagoing planes.

A more particular object of my invention is to provide, in an aircraft powered in part by nuclear energy, means for effectively protecting its crew, passengers and cargo from harmful radiation during normal flight as well as in the event of a mishap.

It is also an object of the instant invention to provide an aeronautical propulsion system which utilizes in a most effective manner two kinds of fuel, i.e. combustible and nuclear power sources, so as to minimize the fraction of the load-carrying capacity of the craft which must be allotted to fuel transportation while affording an almost unlimited cruising range along with maximum safety from nuclear hazards.

An aircraft embodying my invention comprises a fuselage and a wide-span wing structure extending on opposite sides thereof, this wing structure supporting the propulsion means, such as a bank of propellers on each side of the fuselage, along with a main and an auxiliary power source therefor, the main power source serving for cruising while the auxiliary power source is used only to provide added lift, i.e. during takeoff and climbing or under emergency conditions (e.g. upon failure of the main power source). Specifically, the main power source is supported at the tips of the wing structure, thus at locations remote from the fuselage, and may therefore be constituted by a pair of nuclear reactors suitably shielded toward the latter; the auxiliary power source is supported in the region of the propulsion means, thus at locations closer to the fuselage, and comprises two or more engines (e.g. gas turbines) consuming combustible fuel. Advantageously, each propeller is provided with its individual, selectively activatable combustible-fuel booster engine whereas all the propellers on one side of the fuselage are energized in parallel from the associated main power plant, e.g. by a common mechanical transmission or by separate electromotors connected in parallel to a generator at the main power plant. In either case I prefer to interconnect these propellers by a mechanical linkage for synchronous rotation so that all the available power is uniformly distributed among them, even in the event of failure of one or more individual booster engines or electromotors.

The mounting of the main power plants on the wing tips, in special nacelles which advantageously are pontoon-shaped to serve as outrigger floats in the case of a flying boat, permits these power plants to be jettisoned in an emergency without endangering the aircraft proper; the nacelles themselves may be suitably equipped with parachutes and other safety devices to insure a soft landing if they have to be dumped over land.

A highly effective utilization of the thrust of a propeller bank on the wing structure for the creation of lift becomes possible if, pursuant to a further feature of my invention, that structure consists of two or more airfoils disposed one above the other on opposite sides of the fuselage, with the propellers arranged in at least one row between the levels of an upper airfoil and a preferably smaller lower airfoil interconnected at their tips by a strut which supports the nacelle for the associated main power plant and advantageously has the shape and function of a lateral fin. This strut, along with the fuselage, complements the airfoils on each side of the craft to a generally rectangular frame defining an elongated opening for the propeller air stream. Flaps on the airfoils, especially the upper one, can be deflected downwardly to produce a lifting force, the upper flaps then extending directly into the air flow and being advantageously formed with slots for breaking up a boundary layer therealong. To increase the thrust of the propellers, another feature of my invention provides for the channeling of a heat-exchanging fluid past the surfaces of these airfoils facing the airstream, i.e. the lower surface of the upper airfoil and the upper surface of the lower one, whereby the air flow is heated and the main power plant is more effectively cooled. Considerable savings in propulsion energy can be realized through this utilization of waste heat from the outlying nacelles.

The invention will be described in greater detail with reference to the accompanying drawing in which:

FIG. 1 is a front-elevational view of a long-range flying boat of a large wing span according to the invention;

FIG. 2 is a top plan view of a flying boat shown in FIG. 1;

FIG. 3 is a side-elevational view of the flying boat;

FIG. 7 is a cross-sectional view taken on the line VII—VII of FIG. 6.

Figure 4:
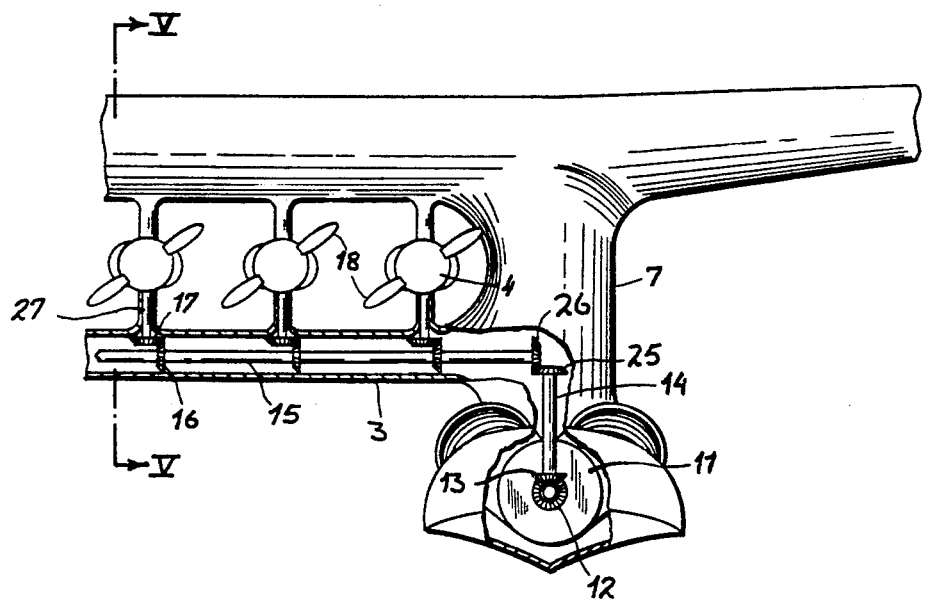
FIG. 4 is a fragmentary front view of the wing assembly of the flying boat of FIGS. 1–3, drawn to a larger scale and with parts broken away, showing details of the propulsion system.

The flying boat shown in FIGS. 1–3 comprises a fuselage 1 with the usual cabin 50, a conventional tail assembly 9 and a wing structure 20 composed of a pair of major airfoils forming part of a continuous upper wing 2, a pair of minor airfoils 3 below the wing 2 and end struts 7 interconnecting the tips of the airfoils 2, 3 on opposite sides of the fuselage. The elongated space framed by the airfoils 2, 3 and the struts 7 on both sides of the fuselage 1 accommodates a bank of propellers 18 disposed, as best seen in FIGS. 5 and 7, between the approximately aligned leading edges of the upper and lower airfoils. Upper and lower struts 5, 6, which like the larger end struts 7 are of streamlined profile, support a row of gas turbines 4 whose shafts 21 carry the propellers 18; a nacelle 8 suspended from each strut 7 contains the main power plant for the propellers 18, this power plant having been shown in FIGS. 4 and 5 as another gas turbine 11 of larger capacity. The nacelles 8 are pontoon-shaped like the fuselage 1 and are somewhat elevated above the latter to serve as auxiliary outrigger floats when the boat is on the water.

The upper wing 2 has lateral extensions 10 beyond the struts 7, these extensions carrying ailerons 22 along their trailing edges. In addition, this wing is provided with articulated rear flaps 23 adapted to be deflected downwardly as illustrated in dot-dash lines in FIG. 7 to produce lift or to act as air brakes; similar flaps 24 are formed on the trailing edges of the lower air foils 3.

Figure 5:
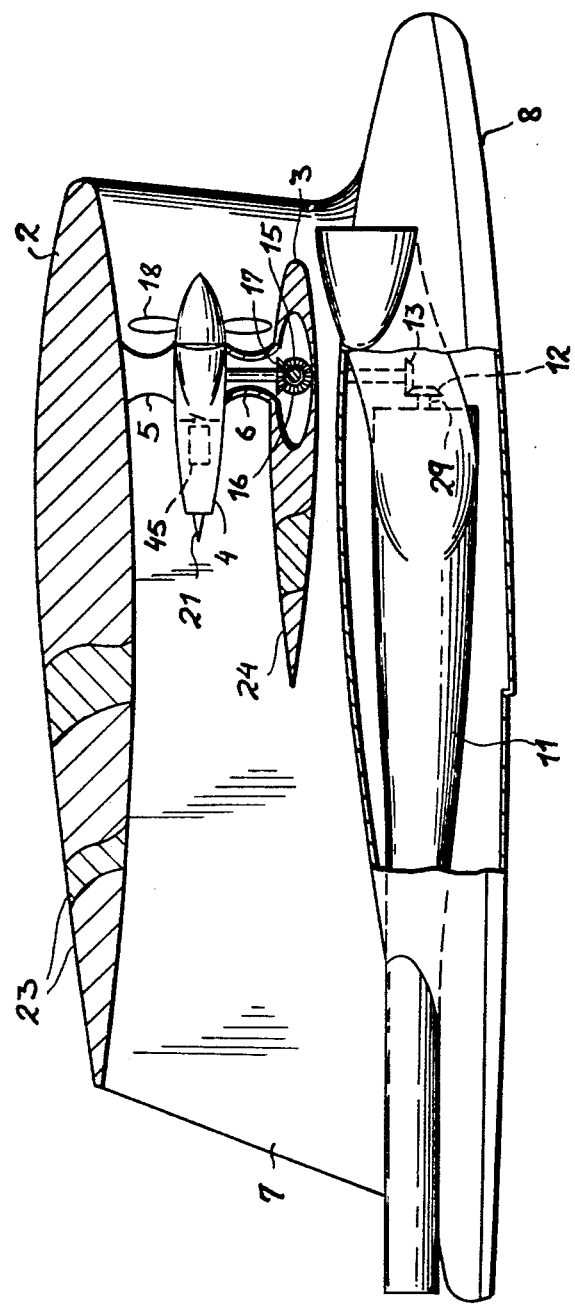
FIG. 5 is a cross-sectional view taken on the line V—V of FIG. 4.

The power plant 11 shown in FIGS. 4 and 5 has an output shaft 29 carrying a bevel gear 12 which meshes with another bevel gear 13 on a vertical shaft 14, journaled (in a manner not further illustrated) within the struts 7, this shaft being coupled with a horizontal transmission shaft 15 inside airfoil 3 via further bevel gears 25, 26. Shaft 15 carries a set of other bevel gears 16 in mesh with respective bevel gears 17 on vertical shafts 27 which, via additional bevel gears not shown, drive the propeller shaft 21 of respective turbines 4. Thus, all the propellers 18 on either side of the fuselage 1 are driven in synchronism from the associated main power plant 11, the transmisison shaft 15 further serving to distribute among these propellers the additional driving power from any booster engine 4 which has been placed in operation.

It is contemplated that the booster engines 4 are operated only when extra power is required, as during take-off and climbing, and that during normal cruising the power is exclusively supplied by the two outboard power plants 11. The controls for selectively cutting the booster engines in or out have been illustrated diagrammatically as a relay 45, FIG. 5, which in its operated state activates the turbine 4 by electromagnetically or otherwise coupling its compressor (not shown) to the rotating propeller shaft 21.

Figure 6:
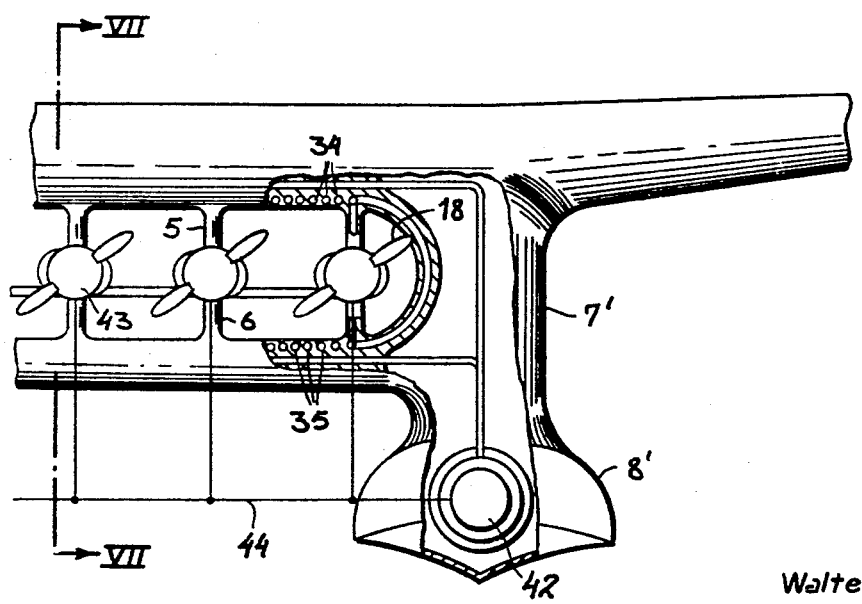
FIG. 6 is a view similar to FIG. 4, showing a modified propulsion system.

In the modified propulsion system of FIGS. 6 and 7 I provide a main power plant 11' in the form of a nuclear reactor whose output is transmitted as thermal energy to a steam engine 30 via a circulation system 31 feeding a hot fluid such as liquid sodium to a heat exchanger 32 whence high-pressure steam passes through a conduit 33 to the engine 30 and is circulated as hot water or low-pressure steam through a system of pipes 34, 35 along the lower surface of upper airfoil 2 and the upper surface of lower airfoil 3 as well as within the adjoining struts 5, 6. The residual heat carried by the circulating fluid raises the temperature and thereby the thrust of the air stream generated by the propellers 18. When the sectioned flaps 23, 24 are deflected downwardly, this air stream escapes in part through slots 36 formed between the articulated members of the upper flap 23 so as to break up the boundary layer of air tending to form along the flap surface. Since the upper flap 23 with its slots 26 is disposed directly in the path of the air flow, this action is highly effective in creating lift.

The reactor 11' is shielded from the fuselage 1 by suitable means here shown as an accordion-pleated bellows 37, the pleating being designed to prevent rupture in the event of unusual strains. Nacelle 8', carrying the reactor 11', has been shown connected with its strut 7' by a series of explodable bolts 38 whose squibs 39 can be detonated from the cockpit if the need therefor should arise. In such an event, the nacelle 8' drops free of the aircraft, a parachute 40 in its rear being opened by a ripcord 41 to slow its descent.

In the systems of FIGS. 6 and 7 the power from reactor 11' and steam plant 30 drives an electric generator 42 which energizes individual electromotors 43 mounted in tandem with the associated booster turbines 4 on the shafts 21 of the propellers 18. The circuit connecting generator 42 in parallel across the individual motors 43 has been illustrated diagrammatically at 44.

The aircraft herein disclosed is intended for operation at subsonic speeds and, when designed for land use, may carry payloads up to the limits permitted for existing landing facilities, e.g. between 300 and 600 tons, especially with nuclear reactors as continuously operating power plants. In case of flying boats the payloads may well range between 1000 and 6000 tons. Particularly when designed as a flying boat, the aircraft according to my invention will fill a gap now existing between the slower hydrofoils and conventinal high-speed seaplanes of the relatively limited carrying capacity.

The provision of means for supplementing the output of a nuclear reactor by booster engines using combustible fuels, as described in conjunction with FIGS. 6 and 7, increases the starting load of the craft only moderately if the use of the booster engine is limited to take-off and short in-flight intervals. The nuclear reactors, in turn, may be of modest size if needed to supply full power only during cruising, hence the problem of shielding is greatly simplified and accessibility to vital parts of the craft (e.g. for the quenching of a fire) will not be impeded. The aircraft, apart from its commercial or military utility, may also be used as a flying launching pad, landing platform or observation base for space vehicles, by virtue of the almost unlimited length of time it is able to remain aloft when powered by nuclear fuel.

I claim:
1. An aircraft comprising:
a fuselage;
a wing structure secured to said fuselage and extending outwardly therefrom on opposite sides of said fuselage, said wing structure including at least two vertically spaced generally parallel airfoils having surfaces defining air-flow ducts through said wing structure and between said airfoils on each side of said fuselage;
a plurality of forward-propulsion units mounted between the airfoils on each side of said fuselage for inducing a flow of air through said ducts during movement of said aircraft;
at least one engine nacelle mounted on said wing structure on each side of said fuselage and remote therefrom;
first motive means individual to said forward-propulsion units and connected therewith for respectively driving said units;
second motive means individual to said engine nacelles and respectively connected with the forward-propulsion units on the respective side of said fuselage for jointly driving them, at least one of said first and second motive means producing a heated fluid; and
heat-exchanging means lying along at least one of said surfaces and connected with said one of said motive means for receiving said heated fluid and thereby heating said air flow.

2. An aircraft as defined in claim 1 wherein said first motive means includes a plurality of gas-turbine engines each assigned to a respective one of said forward-propulsion units, said gas-turbine engines being connected with said heat-exchanging means along said one of said surfaces.

3. An aircraft as defined in claim 1 wherein said second motive means are nuclear reactors, said nacelles being provided with shield means for intercepting radiation from said reactors toward said fuselage.

4. An aircraft as defined in claim 3, further comprising jettison means for detaching said nacelles from said wing structure under emergency conditions.

5. An aircraft as defined in claim 3, further comprising a mechanical transmission coupling each of said nuclear reactors with a respective group of said forward-propulsion units upon a respective side of said fuselage.

6. An aircraft as defined in claim 3 wherein said nuclear reactors are each provided with a respective electric generator, and each of said forward-propulsion units is provided with an electric motor, the electric motors of said forward-propulsion units on each side of said fuselage being electrically connected with the respective generator for simultaneous operation thereby.

7. An aircraft as defined in claim 6, further comprising mechanical transmission means interconnecting the forward-propulsion units on each side of said fuselage for synchronous operation.

8. An aircraft as defined in claim 1, further comprising flap means on the upper of said airfoils, shiftable into the path of said air flow for deflecting the air heated along said one of said surfaces.

9. An aircraft as defined in claim 1, further comprising at least two streamlined struts interconnecting said airfoils on opposite sides of said fuselage and forming said one of said surfaces, said heat-exchanging means being mounted in said struts.

10. An aircraft of large wing span comprising a fuselage including a cabin; a wing structure secured to said fuselage, said wing structure including a plurality of vertically spaced horizontal airfoils extending transversely from said fuselage on opposite sides thereof; a pair of streamlined struts remote from said cabin interconnecting the tips of said airfoils on opposite sides of said fuselage; a pair of nacelles respectively supported by said struts; propulsion means supported on said wing structure at a level between said airfoils on opposite sides of said fuselage; and drive means including a pair of nuclear power plants in said nacelles for energizing said propulsion means, said propulsion means comprising a row of propellers on each side of said fuselage, each of said power plants respectively including an electric generator, said drive means including individual motors for rotating said propellers and circuit means connecting the motors of each row to the adjoining generator.

11. An aircraft as defined in claim 10 wherein the propellers of each row are provided with a mechanical linkage for synchronizing their rotation.

12. An aircraft as defined in claim 10 wherein at least the airfoil immediately above the level of said propellers on each side of the fuselage is provided with trailing-edge flaps extending along each row and downwardly deflectable into the path of the air stream from said propellers.

13. An aircraft as defined in claim 12 wherein said flaps are composed of articulated members separated by slots for modifying a boundary layer of said air stream.

References Cited

UNITED STATES PATENTS

| | | | |
|---|---|---|---|
| 1,318,791 | 10/1919 | Nelson | 244—45 |
| 1,421,803 | 7/1922 | Martin | 244—60 |
| 1,471,243 | 10/1923 | Coffin | 244—42.4 |
| 1,878,808 | 9/1932 | Beaver | 244—42 |
| 1,879,632 | 9/1932 | O'Brien | 244—54 |
| 1,886,327 | 11/1932 | Carlson | 244—58 |
| 1,922,769 | 8/1933 | Kleinhenz | 244—106 |
| 2,013,673 | 9/1935 | Sias | 244—53 |
| 2,488,392 | 11/1949 | Forsyth | 244—53 |
| 3,061,244 | 10/1962 | Max | 244—42 |
| 3,116,212 | 12/1963 | Lindberg | 244—74 |
| 3,121,546 | 2/1964 | Bruyere | 244—55 |

FOREIGN PATENTS

| | | |
|---|---|---|
| 502,680 | 2/1920 | France. |
| 364,413 | 11/1922 | Germany. |

OTHER REFERENCES

Aviation Week, May 6, 1957, p. 53; July 13, 1959, pp. 64, 65, 67.

MILTON BUCHLER, *Primary Examiner.*

J. PITTENGER, *Assistant Examiner.*